United States Patent [19]
Miyamoto et al.

[11] Patent Number: 6,018,633
[45] Date of Patent: *Jan. 25, 2000

[54] CAMERA HAVING A DATA RECORDING DEVICE

[75] Inventors: Hidenori Miyamoto, Urayasu; Masao Owashi, Yokohama, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/791,222

[22] Filed: Jan. 30, 1997

[30] Foreign Application Priority Data

Jan. 31, 1996 [JP] Japan ................................. 8-016020

[51] Int. Cl.$^7$ ................................................. G03B 17/24
[52] U.S. Cl. ........................................ 396/320; 396/542
[58] Field of Search .............................. 396/85, 301, 319, 396/320, 373, 268, 269, 542, 435, 406

[56] References Cited

U.S. PATENT DOCUMENTS

| | | | |
|---|---|---|---|
| 5,305,051 | 4/1994 | Irie et al. | 396/435 |
| 5,559,570 | 9/1996 | Soshi et al. | 396/55 |
| 5,640,629 | 6/1997 | Hibino et al. | 396/319 |

*Primary Examiner*—Safet Metjahic
*Assistant Examiner*—Michael Dalakis

[57] ABSTRACT

A camera with a data recording device separates a connecting line of a magnetic recording device and a connecting line of a film frame detection device to reduce the transfer of electrical noise therebetween. The camera includes a magnetic head for transferring photographic information to and from photographic film and the photographic film includes a magnetic recording track which is capable of magnetic recording of photographic data. A pair of photo-reflectors detects a photographic frame in the photographic film, and a central processing unit is equipped with a frame detection terminal to electrically connect the photo-reflectors with a flexible printed circuit. A terminal for magnetic recording and readout electrically connects to a magnetic head with a pattern on a printed board and a connecting line. The terminal for magnetic recording and readout is physically separated from other high electrical noise terminals to reduce the transmission of electrical noise. Likewise, the flexible printed circuit and the connecting line and respective circuit patterns are physically separated to reduce the transmission of electrical noise.

21 Claims, 3 Drawing Sheets

CAMERA HAVING A DATA RECORDING DEVICE

CROSS-REFERENCE TO RELATED APPLICATIONS

This application is based upon and claims priority of Japanese Patent Application No. 08-016020 filed Jan. 31, 1996, the contents of which being incorporated herein by reference.

BACKGROUND OF THE INVENTION

The present invention relates to a camera having a data recording device which records photographic data on camera film. More particularly, the present invention relates to a camera having a data recording device which reduces electrical noise through separation of high noise electrical lines and low noise electrical lines.

Cameras are known which have film frame detection devices which detect the presence of individual frames on a camera film and magnetic recording devices which magnetically record data on the camera film. In this kind of camera, a control circuit receives detection data from a film frame detection device and outputs magnetic data to a magnetic recording device. The control circuit is usually mounted on a printed circuit board.

In Japanese Laid-Open Patent Publication JP-A-6-138536, a camera printed circuit board is located approximately parallel to and toward a rear side of a film surface. However in this technology, control circuit elements and a liquid crystal display panel are disposed on a printed board which is located toward the back of the film surface. Thus, a problem arises in that the thickness of the camera is increased by the thickness of the printed board and circuit elements. In order to solve this problem, the printed board has been moved to an upper portion of the camera to reduce the thickness of the camera.

However, when the control circuit is located in the upper portion of the camera, the connections between the control circuit and the film frame detection device and the magnetic recording device, which are at a rear surface of a camera film, become long. In particular, another problem arises in that the relatively long connecting line to the magnetic recording device is easily affected by electrical noise. There is also a tendency for the connecting line to be affected by electrical noise from the connecting line to the film frame detection device.

BRIEF SUMMARY OF THE INVENTION

It is therefore an object of the present invention to provide a reduced thickness camera having a data recording device which is unaffected by electrical noise.

It is a further object of the invention to provide a reduced thickness camera with a first connecting line to a low electrical noise device such as a magnetic recording device and a second connecting line to a high electrical noise device such as a film frame detection device to thereby reduce electrical noise in the camera.

It is still a further object of the present invention to provide a camera with strong electrical noise signal lines connected to a first connecting unit and a first connecting member, and weak electrical noise signal lines connected to a second connecting unit and a second connecting member. Through separation of the weak electrical noise signal lines from the first connection unit and the first connecting member, which become electrical noise generation sources, magnetic processing which is unaffected by electrical noise can be reliably obtained.

It is a further object of the invention to reduce a number of processes within a camera which are affected by electrical noise. Electrical noise may be reduced within the camera by a first connecting member and a second connecting member which are located about opposite sides of an eyepiece of a camera viewfinder.

Moreover, it is an even further object of the invention to provide a camera with a viewfinder displaced to either a left or right side of camera center. Accordingly, a first connecting unit and a first connecting member, having many signal lines, can be located in a wider space, and design of the surroundings of the connecting members is facilitated, and the number of manufacturing processes can be reduced.

It is a further object of the invention to provide a camera with a liquid crystal display device or similar display unit, which tends to be a source of electrical noise generation and which is located remotely from connecting units and connecting members of a magnetic processing unit. Accordingly, magnetic processing which is unaffected by electrical noise and records or reads out with high reliability can be attained.

It is still a further object of the invention to provide a camera with reduced electrical noise within a camera rangefinder. An amplifier circuit of a light receiving element of the camera rangefinder tends to be affected by electrical noise. Thus, through location of the amplifier circuit on a side separated from a connecting unit and a connecting member of the frame detection unit, the amplifier circuit does not receive the effects of electrical noise. This provides a rangefinding process of high accuracy.

Objects of the invention are achieved by a camera with a data recording device, including a magnetic processing unit to magnetically transfer photographic information to or from photographic film; a frame detection unit to detect a photographic frame in the photographic film; and a control unit to control the magnetic processing unit and the frame detection unit, the control unit includes a first connecting unit to electrically connect to the frame detection unit with a first connecting member, and a second connecting unit to electrically connect to the magnetic processing unit with a second connecting member; wherein the first connecting unit and the second connecting unit are physically separated such that they do not transfer electrical noise therebetween, and the first connecting member and the second connecting member are physically separated such that they do not transfer electrical noise therebetween.

Objects of the invention are further achieved by a camera having a control unit located within a camera body approximately adjacent to or above an eyepiece of a viewfinder; a magnetic processing unit located in a position facing a magnetic recording region of a photographic film; a frame detection unit located in a position facing perforations within the photographic film; and at least a portion of the first connecting member and at least a portion of the second connecting member located on opposite sides of the eyepiece.

Moreover, objects of the invention are achieved by a camera having an eyepiece displaced about the left or the right of center of a camera body; and a first connecting member located within the camera body in an opposite direction from the displacement of the eyepiece.

Further objects of the invention are achieved by a camera with a data recording device, including a control unit which is a large scale integrated circuit; first and second connecting units which are each pin units of the large scale integrated circuit; and wherein the first and second connecting units each include a pattern on a printed board on which the large scale integrated circuit is mounted.

Further objects of the invention are achieved by a camera with a data recording device including a magnetic processing unit to magnetically transfer photographic information to or from photographic film; a display unit to display photographic data; and a control unit to control the magnetic processing unit and the display unit, the control unit including a connecting unit which electrically connects to the magnetic processing unit with a connecting member; wherein the display unit is separated from the connecting unit and the connecting member such that they do not transfer electrical noise therebetween.

Objects of the invention are also achieved by a camera having a first flexible printed circuit transmitting high electrical noise signals and a second flexible printed circuit transmitting low electrical noise signals, wherein the first and second flexible printed circuits are disposed on alternate sides of a camera viewfinder and connected to opposite sides of a control circuit board.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
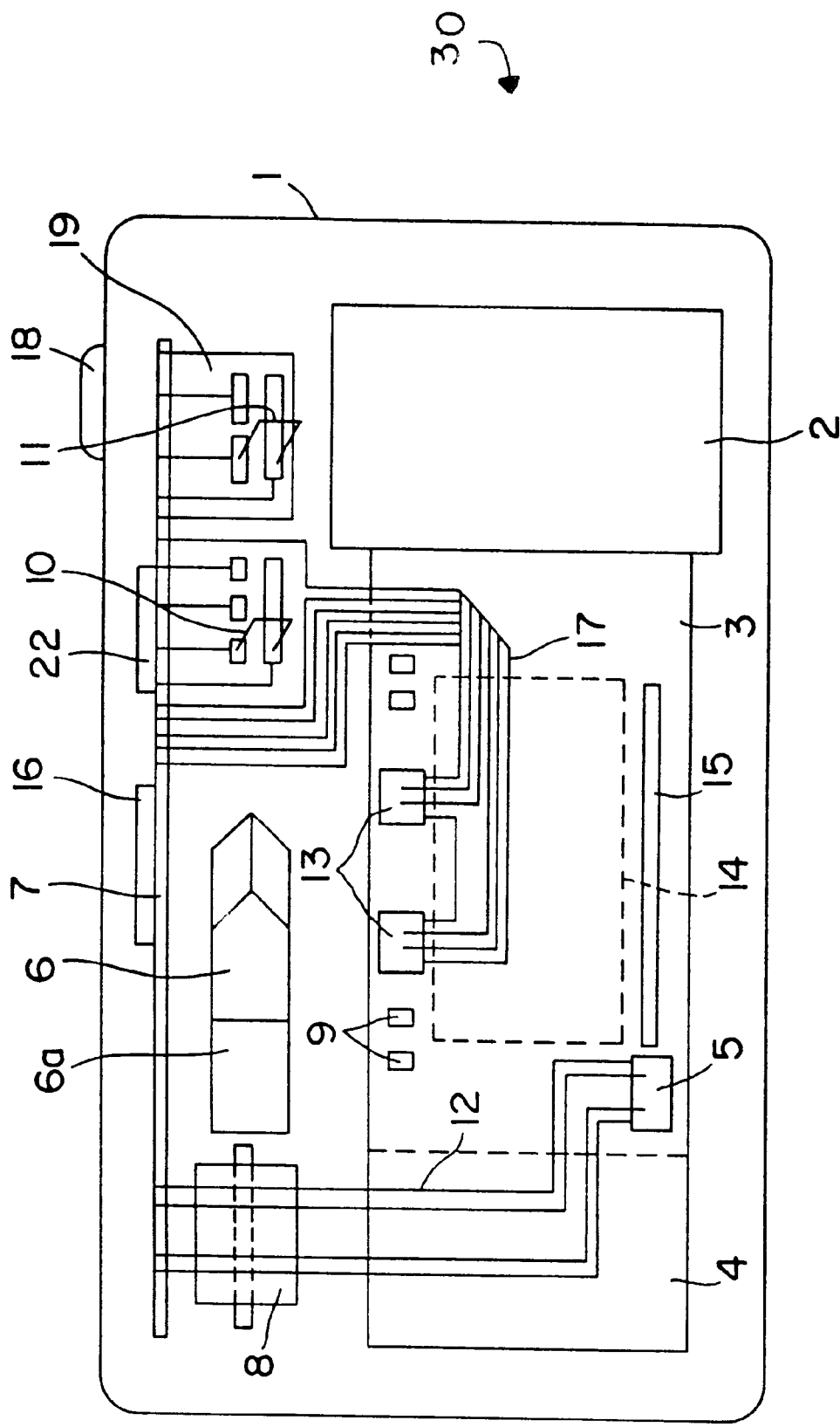
FIG. 1 is a rear view of an internal structure of a camera according to a preferred embodiment of the present invention.

Reference will now be made in detail to the preferred embodiments of the present invention, examples of which are illustrated in the accompanying drawings, wherein like reference numerals refer to like elements throughout.

FIG. 1 is a rear view of an internal structure of a camera 30 according to a preferred embodiment of the present invention. FIG. 1 illustrates camera cover 1, film cartridge 2, photographic film 3, film windup spool 4, and magnetic head 5. Perforation 9 is formed in photographic film 3 for use in frame recognition. Magnetic head 5 is used for magnetic recording and readout.

As illustrated in FIG. 1, viewfinder unit 6 includes eyepiece 6a. Control circuit board 7 and strobe light generating unit 8 are also disposed within camera cover 1. Changeover switch 10 changes over a printing format, while zoom switch 11 initiates a zoom function. Connecting line 12 electrically connects magnetic head 5, for use in magnetic recording and readout, to control circuit board 7. Reference numeral 13 represents two photo-reflectors which function as a frame detection unit by detecting perforations 9.

Aperture 14 forms a photographic image on photographic film 3. Magnetic recording track 15 is written onto or read out from photographic film 3 by magnetic head 5. Reference numeral 16 represents a one-chip microprocessor (termed "CPU" hereinbelow) which is mounted onto control circuit board 7, and reference numeral 17 represents an FPC (Flexible Printed Circuit) which connects a signal line of print format changeover switch 10 and photo-reflectors 13 to control circuit board 7. Shutter release switch 18 provides shutter release to camera 30 and FPC 19 (Flexible Printed Circuit) connects a signal line of zoom switch 11 to control circuit board 7. According to a preferred embodiment of the present invention, connecting line 12 is also constituted by a flexible printed circuit.

As illustrated in FIG. 1, film cartridge 2 is loaded into a right-hand side grip, as observed from a rear view of the camera. Perforations 9 are formed in an upper side of photographic film 3 in order to detect frames, and magnetic recording track 15 is formed on a lower side of photographic film 3. Magnetic head 5, for use in magnetic recording and readout, is located in a downward direction from the lower end of aperture 14, between aperture 14 and spool 4, for use during film windup. Moreover, photo-reflectors 13 are located in an upward direction from the upper side of aperture 14.

On the other hand, eyepiece 6a of viewfinder unit 6 is located on a left-hand side and upward from a center of camera 30. Accordingly, electrical connecting line 12 of control circuit board 7 and magnetic head 5 pass through the left-hand side of eyepiece 6a. Thus, FPC 17 is kept away from electrical connecting line 12 by eyepiece 6a during connection to photo-reflectors 13. FPC 17 passes through a right-hand side of the eyepiece 6a.

Zoom switch 11, having a high frequency of use, is located at a right-hand end upper portion for easy operation with the right thumb while looking through viewfinder unit 6. Print format changeover switch 10 is located adjacent and to the left of zoom switch 11. Changeover switch 10 and zoom switch 11 are directly connected to control circuit board 7, as illustrated in FIG. 1. The connecting lines from zoom switch 11, print format changeover switch 10, and photo-reflectors 13 are also arranged to run on the right-hand side of viewfinder eyepiece 6a. Connecting line 12 of magnetic head 5 is arranged to run on the left-hand side of viewfinder eyepiece 6a.

Figure 2:
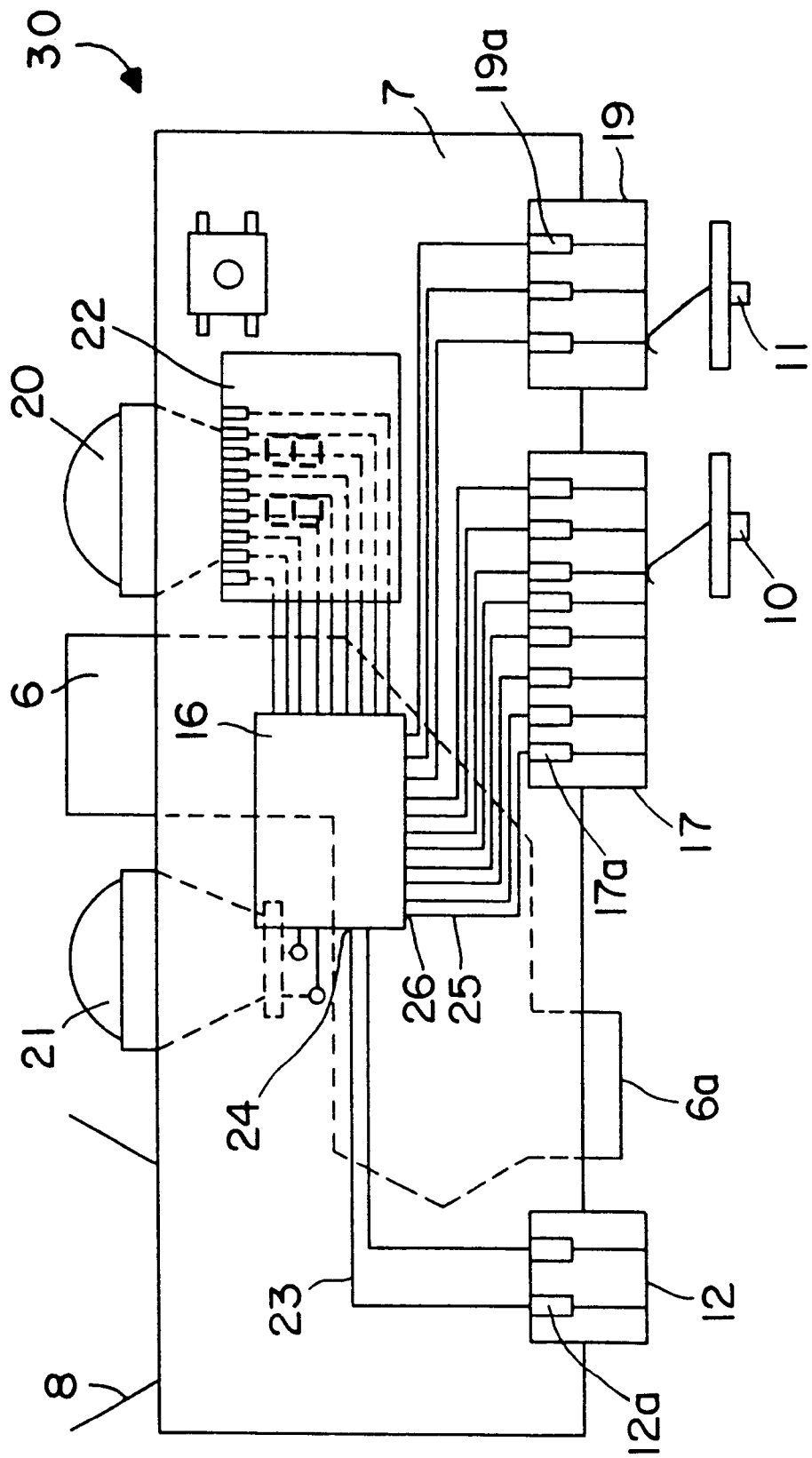
FIG. 2 is a top view of a camera having a control circuit board according to a preferred embodiment of the present invention.

FIG. 2 is a top view of a camera having a control circuit board 7 according to a preferred embodiment of the present invention. Light emitting element 20 is used to sending a rangefinding signal receiving the rangefinding and light receiving element 21 is for signal device. Liquid crystal display device 22 provides a status display for camera 30.

An amplifier circuit for a received light signal is built into light receiving element 21, and thus forming rangefinding device. The received light signal is then input to CPU 16 as an amplified rangefinder signal. At this location, light receiving element 21 is located in the vicinity of CPU 16. Further, the rangefinder signal terminals are assigned to an opposite side of eyepiece 6a from the connecting terminals of CPU 16. The connecting terminals of CPU 16 are connected to the lines from the liquid crystal display device 22, which tends to be a source of electrical noise. Thus, the rangefinder signal is unaffected by electrical noise from the frame detection line.

Reference numerals ar, 17a and 19a denote solder bridges which connect connecting line 12, FPC 17, and FPC 19 to control circuit board 7. These solder bridges may optionally be replaced by pressure contacts or by lead wires. Reference numeral 23 represents patterns of control circuit board 7 which connect connecting line 12 from magnetic head 5, via solder bridges 12a, to a terminal of CPU 16. Reference numeral 25 represents patterns of control circuit board 7 which join a connecting line of FPC 17 from photoreflectors 13, via the solder bridge 17a, to terminals 26 of CPU 16 for frame detection use.

Terminals 24, for use in magnetic recording and readout, and terminals 26 for frame detection use, are assigned to mutually different sides of CPU 16. However, even if these terminals 24 and 26 are on the same side of CPU 16, at least they may be arranged mutually separated and not in adjacent positions. Moreover, the pattern design is made such that patterns 23 and patterns 25 do not come into close proximity to each other. The liquid crystal display device 22 is located opposite to terminals 24 to patterns 23 with CPU 16 therebetween. Thus, the magnetic recording and readout signals are unaffected by electrical noise.

Figure 3:
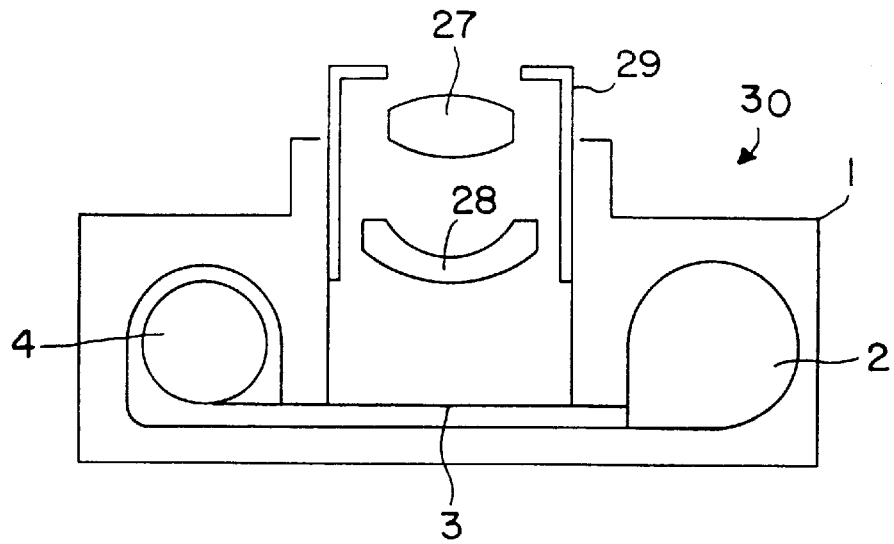
FIG. 3 is a sectional view of a camera according to a preferred embodiment of the present invention.

FIG. 3 illustrates a cross sectional view of camera 30 in a downward direction of control circuit board 7. In FIG. 3, reference numerals 27 and 28 denote lenses of a zoom lens optical system. Zooming operations are performed by changing the distance of lenses 27 and 28 by moving lens barrel 29 in an optical axis direction by way of a drive device (not shown).

Figure 4:
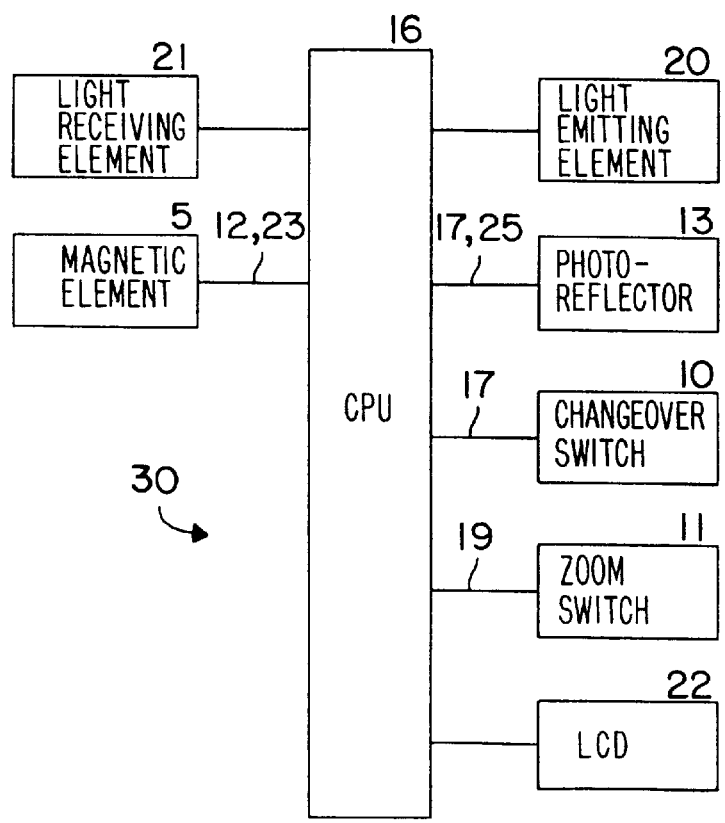
FIG. 4 is a block diagram of a camera according to a preferred embodiment of the present invention.

FIG. 4 illustrates a block diagram of the elements discussed above with reference to FIGS. 1 and 2. As described above, connecting line 12, patterns 23, and terminals 24 for use in magnetic recording and readout have an associated weak electrical noise. Accordingly, connection with magnetic head 5, for use in magnetic recording and readout, and CPU 16 is arranged remotely from connecting lines 17, patterns 25, and terminals 26 for frame detection use, which tend to become sources of electrical noise generation. Thus, magnetic recording track 15 of photographic film 3 is unaffected by electrical noise and reliable magnetic recording and readout can be attained. Moreover, because connecting line 12 and connecting lines 17 are located on opposite sides of eyepiece 6a of viewfinder unit 6, the number of manufacturing processes may be reduced. This increases ease of assembly and reliability of product operation.

Moreover, because connecting line 12 and connecting lines 17 are separated, even if connecting line 12 has a long connection distance and is a flexible printed circuit, electrical noise is reduced. Electrical noise is also reduced because there are only a small number of signals in the flexible printed circuit, which accordingly requires a narrow width. On the other hand, connecting lines 17 have to be a wide flexible printed circuit because the number of signals is large, and the flexible printed circuit is short.

In this manner, the design reduces the use of flexible printed circuits which have a high cost. Furthermore, eyepiece 6a of viewfinder unit 6, as seen from the rear view of camera 30 in FIG. 1, is placed to the left. By locating the connecting lines 17, which carry many signals, in a wide space maintained on the right-hand side of the eyepiece 6a, the lines 17 are well designed with ease and effectiveness. Moreover, the design of patterns 25 becomes easy.

Furthermore, liquid crystal display device 22, which tends to be a source of electrical noise generation, is located at an opposite side from the terminal for use in magnetic recording and readout and the rangefinder signal terminal. This is such that magnetic recording and readout are unaffected by electrical noise from liquid crystal display device 22. Thus, a rangefinding process which has high accuracy can be realized.

A camera has been described according to a preferred embodiment of the present invention which performs magnetic recording and readout, frame detection, liquid crystal display, and rangefinding. However, the present invention is not limited to this mode of embodiment. For example, the present invention can also be applied to cameras which have been limited to functions such as magnetic recording and readout and frame detection, magnetic recording and readout and liquid crystal display, frame detection and rangefinding, or liquid crystal display and rangefinding. Moreover, regarding magnetic recording and readout, a limitation may be made to magnetic recording only or magnetic readout only.

A camera according to the present invention performs magnetic recording and magnetic readout. However, the embodiments of the present invention may also be applied to the case of a camera which records photographic data optically and receives the effect of, or is affected by, electrical noise.

Although a few preferred embodiments of the present invention have been illustrated and described, it will be appreciated by those skilled in the art that changes may be made in these embodiments without departing from the principles and spirit of the invention, the scope of which is defined in the claims and their equivalents.

What is claimed is:

1. A camera having a camera body enclosing a data recording device, comprising:
    an aperture through the camera body to expose photographic film;
    a magnetic head to magnetically transfer photographic information to or from the photographic film;
    a frame detection unit disposed above said aperture to detect a photographic frame in the photographic film, said frame detection unit being a source of electrical noise; and
    a control circuit board disposed above said aperture to control said magnetic head and said frame detection unit, said control circuit board including
        a first flexible branch electrically connected to said frame detection unit and carrying a signal having electrical noise; and
        a second flexible branch electrically connected to said magnetic head and carrying a signal having less electrical noise than said first flexible branch,
    wherein the first flexible branch and the second flexible branch are physically separated by said aperture such that electrical noise is not transferred therebetween.

2. The camera according to claim 1, further comprising:
    a viewfinder having an eyepiece,
    wherein the camera body encloses said control unit approximately adjacent to or above the eyepiece of said viewfinder, said magnetic head is located in a position facing a magnetic recording region of the photographic film, said frame detection unit is located in a position facing perforations within the photographic film, and at least a portion of said first flexible branch and at least a portion of said second flexible branch are located on opposite sides of the eyepiece.

3. The camera according to claim 2, wherein:
    the eyepiece is displaced to the left or the right of the center of the camera body; and
    said first flexible branch is located within the camera body in an opposite side of the center of the camera body with respect to the displacement of the eyepiece.

4. The camera according to claim 1, wherein said control unit is a large scale integrated circuit, and said control circuit board includes first and second connecting units as pin units of a large scale integrated circuit.

5. The camera according to claim 2, wherein said first and second connecting units are terminals on said control circuit board.

6. A camera with a data recording device, comprising:
   a camera body defining a chamber for advancing photographic film along a photographic film path;
   a viewfinder;
   a magnetic head to magnetically transfer photographic information to or from photographic film;
   a display unit to display photographic data; and
   a control circuit board to control said magnetic head and said display unit, said control circuit board including
      a central processing unit;
      a first flexible branch electrically connected to said magnetic head and carrying a signal to said central processing unit, and
      a second flexible branch electrically connected to said display unit and carrying a signal having electrical noise greater than the signal carried by said first flexible branch,
   wherein the first flexible branch and the second flexible branch are separated along opposite sides of said viewfinder such that electrical noise is not transferred therebetween.

7. The camera according to claim 6, wherein said display unit is a liquid crystal display device.

8. A camera with a data recording device, comprising:
   a liquid crystal display device to display information about photographic film;
   a rangefinding device including a light receiving element to perform rangefinding; and
   a control circuit board to control said liquid crystal display device and said rangefinding device, said control circuit board including
      a first flexible branch electrically connected to said liquid crystal display device and carrying a signal having electrical noise, and
      a second flexible branch electrically connected to said rangefinding unit and carrying a signal having less electrical noise than said first flexible signal,
   wherein the first flexible branch and the second flexible branch are disposed on opposite sides of said control unit such that transfer of electrical noise therebetween is suppressed.

9. A camera with a data recording device, comprising:
   a viewfinder;
   a camera body defining a travel path for photographic film;
   a magnetic head to magnetically transfer photographic information to or from the photographic film;
   a frame detection unit to detect a photographic frame in the photographic film; and
   a control circuit board including
      a central processing unit;
      a first flexible branch electrically connected to said magnetic head and carrying a signal to said central processing unit;
      a second flexible branch electrically connected to said frame detection unit and carrying a signal having greater electrical noise than the signal carried by the first flexible branch,
   wherein the first flexible branch and the second flexible branch are physically separated by said viewfinder such that transfer of electrical noise is suppressed.

10. A camera with a data recording device, comprising:
   a first device generating electrical noise;
   a second device generating lower electrical noise than said first device;
   a viewfinder including an eyepiece;
   a control circuit board including a central processing unit physically located approximately adjacent to or above said viewfinder, said control circuit board including
      a first flexible branch connected to said first device and carrying a signal having electrical noise, and
      a second flexible branch connected to said second device and carrying a signal having lower electrical noise than said first flexible branch,
   wherein the first flexible branch and the second flexible branch are physically located on opposite sides of said viewfinder thereby suppressing transfer of electrical noise therebetween.

11. The camera according to claim 10, wherein said second device is a magnetic head to magnetically transfer photographic information to or from photographic film.

12. The camera according to claim 10, further comprising:
   a display unit to display photographic data,
   wherein the central processing unit controls said display unit to display said photographic data.

13. The camera according to claim 10, wherein said first device is a photo-reflector which detects perforations in the photographic film to thereby determine if the photographic film is properly framed within the camera.

14. The camera according to claim 10, wherein said first flexible branch is a flexible printed circuit.

15. The camera according to claim 14, wherein said second flexible branch is a flexible printed circuit.

16. The camera according to claim 15, further comprising:
   a first plurality of patterns on said control circuit board which connect to said first flexible branch.

17. The camera according to claim 16, further comprising:
   a second plurality of patterns on said control circuit board which connect to said second flexible branch,
   wherein said first plurality of patterns and said second plurality of patterns respectively connect to the first flexible branch and the second flexible branch on opposite sides of said control circuit board.

18. The camera according to claim 10, further comprising:
   a zoom switch generating relatively high electrical noise,
   wherein said zoom switch is connected to said control circuit board with said first flexible branch.

19. The camera according to claim 18, further comprising:
   a changeover switch to change over a printing format on the photographic film,
   wherein said changeover switch generates a relatively high electrical noise and is connected to said control circuit board with the first flexible branch.

20. The camera according to claim 10, wherein said second device is a magnetic head to magnetically transfer photographic information to or from the photographic film.

21. A camera having a camera body enclosing a data recording device, comprising:
   an aperture through the camera body to expose photographic film;
   a magnetic head to magnetically transfer photographic information to or from the photographic film;

a photo-reflector disposed above said aperture to detect a photographic frame in the photographic film, said photo-reflector being a source of electrical noise; and a control circuit board disposed above said aperture to control said magnetic head and said photo-reflector;

a first flexible branch electrically connected to said photo-reflector and said control circuit board, said first flexible branch carrying a signal having electrical noise; and a second flexible branch electrically connected to said magnetic head and said control circuit board, said second flexible branch carrying a signal having less electrical noise than said first flexible branch and which is susceptible to interference if placed in close proximity to said first flexible branch, wherein the first flexible branch and the second flexible branch are physically separated by said aperture such that electrical noise is not transferred therebetween.

* * * * *

UNITED STATES PATENT AND TRADEMARK OFFICE
CERTIFICATE OF CORRECTION

PATENT NO. : 6,018,633
DATED : January 25, 2000
INVENTOR(S) : Hidenori Miyamoto et al.

It is certified that error appears in the above-identified patent and that said Letters Patent is hereby corrected as shown below:

<u>Title page,</u>
Item [56], References Cited,
U.S. PATENT DOCUMENTS, add
-- 5,517,266   5/1996   Funaki et al. --   and FOREIGN PATENT DOCUMENTS, add
-- 6-138536   5/1994   Japan. --

Signed and Sealed this

Nineteenth Day of February, 2002

Attest:

JAMES E. ROGAN
*Attesting Officer*     *Director of the United States Patent and Trademark Office*